United States Patent
Ikejiri et al.

(10) Patent No.: US 10,487,759 B2
(45) Date of Patent: Nov. 26, 2019

(54) FUEL INJECTION CONTROLLER AND FUEL INJECTION CONTROL METHOD FOR INTERNAL COMBUSTION ENGINE

(71) Applicant: TOYOTA JIDOSHA KABUSHIKI KAISHA, Toyota-shi (JP)

(72) Inventors: Yuki Ikejiri, Nishio (JP); Yoshihisa Oda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/904,526

(22) Filed: Feb. 26, 2018

(65) Prior Publication Data

US 2018/0252175 A1    Sep. 6, 2018

(30) Foreign Application Priority Data

Mar. 3, 2017 (JP) .................. 2017-041162

(51) Int. Cl.
*F02D 41/22* (2006.01)
*F02D 41/02* (2006.01)
(Continued)

(52) U.S. Cl.
CPC .......... *F02D 41/0255* (2013.01); *F01N 3/10* (2013.01); *F01N 3/2006* (2013.01); *F02D 41/22* (2013.01); *F02D 41/402* (2013.01); *F01N 2430/06* (2013.01); *F01N 2430/08* (2013.01); *F02D 2041/2058* (2013.01); *F02D 2041/389* (2013.01); *F02D 2200/021* (2013.01); *Y02T 10/26* (2013.01); *Y02T 10/44* (2013.01)

(58) Field of Classification Search
CPC ............ F02D 41/0035; F02D 41/0255; F02D 41/064; F02D 41/068; F02D 41/402; F01N 3/2006; F01N 2430/085
See application file for complete search history.

(56) References Cited

U.S. PATENT DOCUMENTS

2007/0227506 A1    10/2007  Perryman et al.
2008/0087251 A1    4/2008   Idogawa et al.
(Continued)

FOREIGN PATENT DOCUMENTS

JP     2006-183537     7/2006
JP     2011-122592     6/2011
(Continued)

*Primary Examiner* — Jonathan R Matthias
(74) *Attorney, Agent, or Firm* — Oblon, McClelland, Maier & Neustadt, L.L.P.

(57) ABSTRACT

A fuel injection controller for an internal combustion engine selects as the injection mode either single injection or split injection, counts, based on a drive current detection signal, which indicates that a drive current is generated to be fed to the direct injector, the number of occurrences of the drive current in one combustion cycle as a number-of-injections count value, and determines, based on the number-of-injections count value, whether the combustion state in the cylinder is satisfactory. The fuel injection controller determines that the combustion state in the cylinder is unsatisfactory if the number-of-injections count value in one combustion cycle is one when catalyst warm-up control is being performed with the temperature of the engine being lower than or equal to a predetermined temperature.

6 Claims, 5 Drawing Sheets

(51) Int. Cl.
*F01N 3/10* (2006.01)
*F02D 41/40* (2006.01)
*F01N 3/20* (2006.01)
F02D 41/38 (2006.01)
F02D 41/20 (2006.01)

(56) References Cited

U.S. PATENT DOCUMENTS

2012/0041666 A1* 2/2012 Kemmer ............ F02D 41/0085
  701/104
2018/0010545 A1* 1/2018 Mukaihara .............. F02D 41/22

FOREIGN PATENT DOCUMENTS

JP  2013-036344  2/2013
JP  2013-224621  10/2013

* cited by examiner

Fig.4A
Drive Pulse
(IJT)

ON
OFF

Fig.4B
Drive Current
(Id)

$I_x$

Fig.4C
Drive Current
Detection Signal
(IJM)

High
Low

Fig.4D
Number-of-injections
Count Value
(CinJ)

0   1   2   3 t10   t11 t12   t13   t20

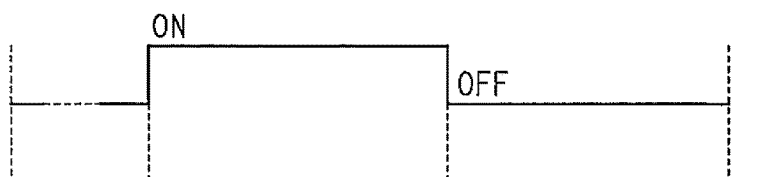
Fig.5A Drive Pulse (IJT)
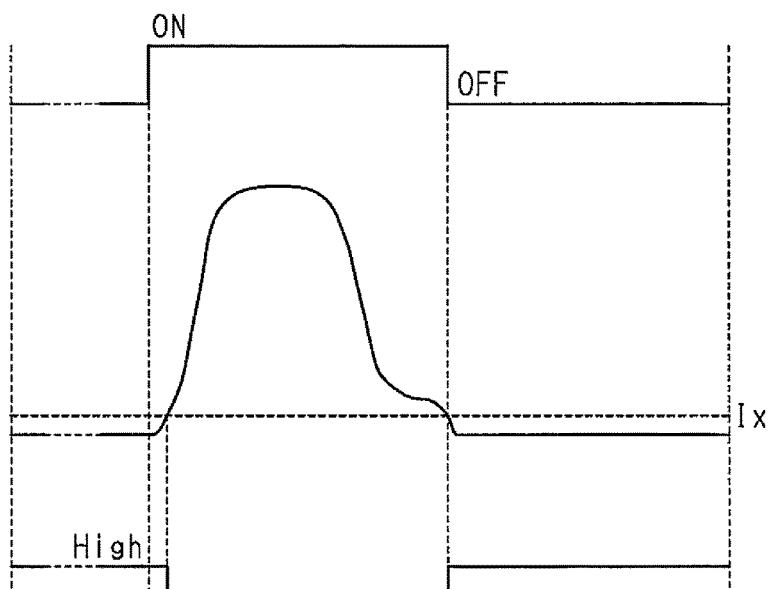
Fig.5B Drive Current (Id)
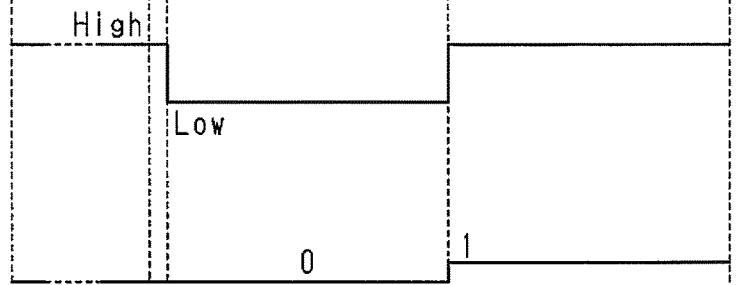
Fig.5C Drive Current Detection Signal (IJM)
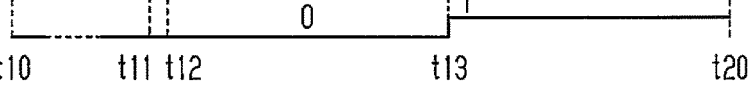
Fig.5D Number-of-Injections Count Value (CInJ)

FUEL INJECTION CONTROLLER AND FUEL INJECTION CONTROL METHOD FOR INTERNAL COMBUSTION ENGINE

BACKGROUND

The present disclosure relates to a fuel injection controller and a fuel injection control method for an internal combustion engine.

Japanese Laid-Open Patent Publication No. 2006-183537 discloses a fuel injection controller used for an internal combustion engine having an electromagnetic direct injector for injecting fuel into a cylinder. The fuel injection controller of the publication performs catalyst rapid warm-up control to warm up the exhaust purification catalyst when predetermined conditions are satisfied, such as a condition that the temperature of the internal combustion engine is low during startup. In addition, during the catalyst rapid warm-up control, the fuel injection controller of the publication controls the direct injector to perform single injection or split injection according to the operation state of the internal combustion engine. The single injection is an injection mode in which the amount of fuel required for each combustion is injected in one fuel injection. The split injection is an injection mode in which the amount of fuel required for each combustion is divided and injected in multiple fuel injections.

When the combustion state of the internal combustion engine deteriorates, such as when inferior fuel is supplied to the internal combustion engine, the engine speed decreases. To avoid excessive decrease in the engine speed, the fuel injection controller may perform the single injection, which is more effective at increasing the torque than the split injection. However, when the single injection is performed during the catalyst rapid warm-up control, the warm-up process of the catalyst slows down as compared to when the split injection is performed. As such, self-diagnosis of the warm-up state is desirable when the single injection is performed during the catalyst rapid warm-up control.

SUMMARY

To achieve the foregoing objective, a fuel injection controller for an internal combustion engine is provided. The internal combustion engine includes an electromagnetic direct injector, which is configured to inject fuel into a cylinder, and an exhaust purification catalyst, which is located in an exhaust passage to purify exhaust. The fuel injection controller includes a number-of-injections determination section, a count section, and a determination section. The number-of-injections determination section is configured to select, as an injection mode, either single injection, in which an amount of fuel required for each combustion is injected in one injection, or split injection, in which the amount of fuel required for each combustion is divided and injected in a plurality of fuel injections, in accordance with an operation state of the internal combustion engine. The count section is configured to count, based on a drive current detection signal, which indicates that a drive current is generated to be fed to the direct injector, a number of occurrences of the drive current in one combustion cycle as a number-of-injections count value. The determination section is configured to determine, based on the number-of-injections count value, whether a combustion state in the cylinder is satisfactory. The determination section is configured to determine that the combustion state in the cylinder is unsatisfactory if the number-of-injections count value in one combustion cycle is one when catalyst warm-up control is being performed on the exhaust purification catalyst with a temperature of the internal combustion engine being lower than or equal to a predetermined temperature.

To achieve the foregoing objective, a method for controlling fuel injection of an internal combustion engine is provided. The internal combustion engine includes an electromagnetic direct injector, which is configured to inject fuel into a cylinder, and an exhaust purification catalyst, which is located in an exhaust passage to purify exhaust, The method includes: selecting, as an injection mode, either single injection, in which an amount of fuel required for each combustion is injected in one injection, or split injection, in which the amount of fuel required for each combustion is divided and injected in a plurality of fuel injections, in accordance with an operation state of the internal combustion engine; counting, based on a drive current detection signal, which indicates that a drive current is generated to be fed to the direct injector, a number of occurrences of the drive current in one combustion cycle as a number-of-injections count value; and determining, based on the number-of-injections count value, whether a combustion state in the cylinder is satisfactory. The determining whether the combustion state in the cylinder is satisfactory includes determining that the combustion state in the cylinder is unsatisfactory if the number-of-injections count value in one combustion cycle is one when catalyst warm-up control is being performed on the exhaust purification catalyst with a temperature of the internal combustion engine being lower than or equal to a predetermined temperature.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 4A to 4D are timing charts showing a case in which the split injection involving three injections is performed; and FIGS. 5A to 5D are timing charts showing a case in which the single injection is performed.

DESCRIPTION OF THE PREFERRED EMBODIMENTS

A fuel injection controller 50 is now described below. Firstly, the schematic structure of an internal combustion engine 10 that uses the fuel injection controller 50 is described.

Figure 1:
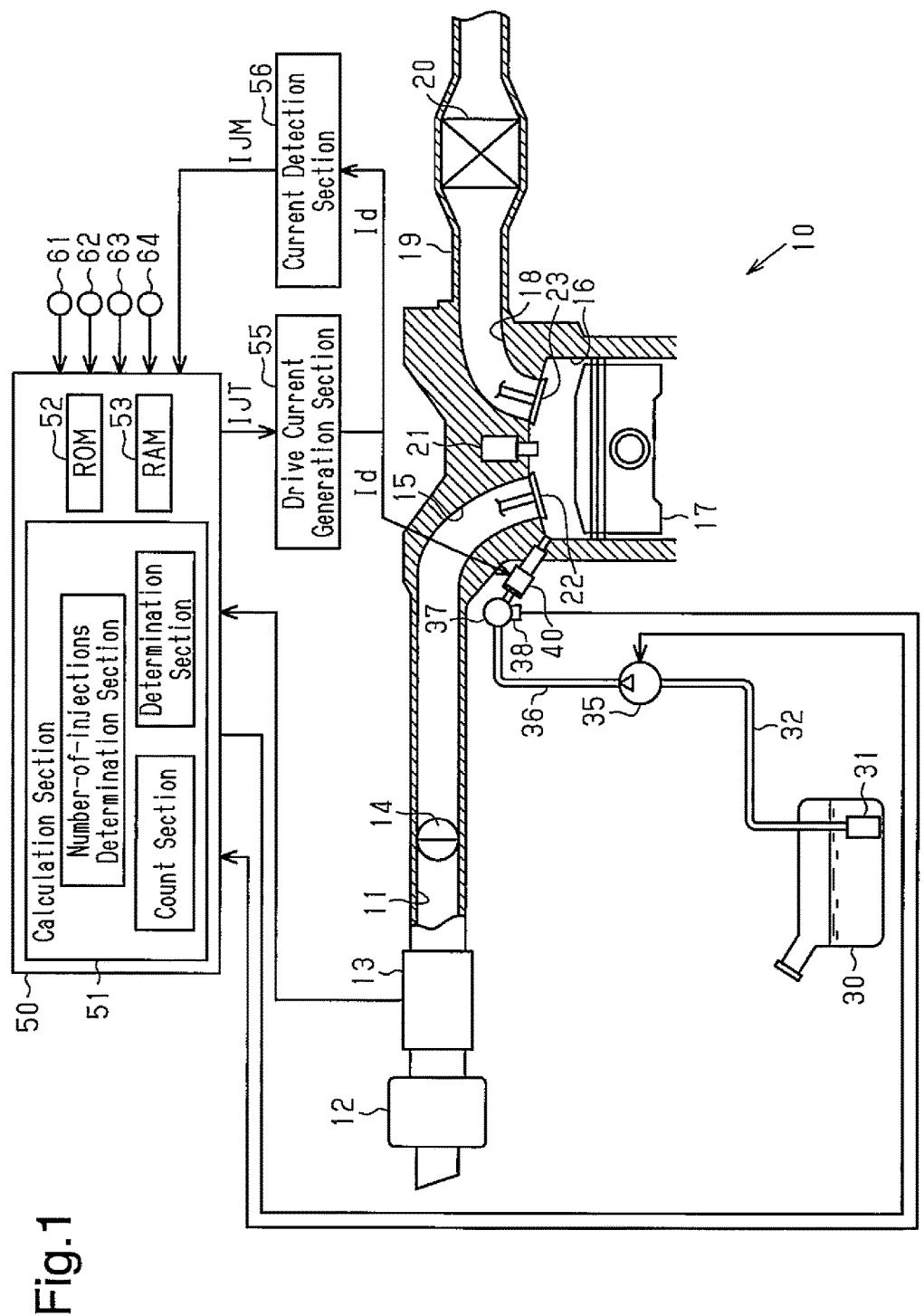
FIG. 1 is a schematic view showing the structure of an internal combustion engine and a fuel injection controller.

As shown in FIG. 1, the internal combustion engine 10 has an intake passage 11, which includes an air cleaner 12 for filtering foreign substances such as dust in the intake air flowing into the intake passage 11. On the downstream side of the air cleaner 12 in the intake passage 11, an air flow meter 13 for detecting the flow rate of intake air is provided. The air flow meter 13 outputs the detected flow rate of the intake air to the fuel injection controller 50. On the downstream side of the air flow meter 13 in the intake passage 11, a throttle valve 14 is provided that adjusts the amount of intake air by changing its opening degree.

A section of the intake passage 11 downstream of the throttle valve 14 is connected to a cylinder 16 through an intake port 15. The cylinder 16 accommodates a piston 17, which reciprocates in the cylinder 16. The cylinder 16 is connected to an exhaust passage 19 through an exhaust port 18. The exhaust passage 19 accommodates an exhaust purification catalyst 20 for removing substances such as carbon monoxide and nitrogen oxides from the exhaust.

A spark plug 21 for igniting fuel is arranged between the intake port 15 and the exhaust port 18 in the cylinder 16. The intake port 15 includes an intake valve 22 for opening and closing the intake port 15. The exhaust port 18 includes an exhaust valve 23 for opening and closing exhaust port 18.

FIG. 1 shows only one set of the cylinder 16, the connected intake and exhaust ports 15 and 18, and other parts, but the internal combustion engine 10 includes a plurality of sets of the cylinder 16, the connected intake and exhaust ports 15 and 18, and other parts.

Each cylinder 16 of the internal combustion engine 10 is supplied with fuel from a fuel tank 30, which stores fuel. The fuel tank 30 accommodates a feed pump 31 for pumping the fuel out of the fuel tank 30 and discharging the fuel into a low-pressure fuel passage 32. The low-pressure fuel passage 32 includes a high-pressure fuel pump 35, which operates under control of the fuel injection controller 50. The high-pressure fuel pump 35 pressurizes the fuel discharged from the feed pump 31 to a predetermined pressure and then discharges the fuel. The high-pressure fuel pump 35 is connected to a high-pressure fuel pipe 37 through the high-pressure fuel passage 36. The high-pressure fuel pipe 37 includes a direct injector 40, which injects fuel supplied through the high-pressure fuel pipe 37. The direct injector 40 is an electromagnetic valve that is controlled by the fuel injection controller 50 to open and close to inject a predetermined amount of fuel into the cylinder 16 of the internal combustion engine 10. The high-pressure fuel pipe 37 also includes a fuel pressure sensor 38, which detects the pressure of the fuel supplied to the direct injector 40. The fuel pressure sensor 38 outputs the value of fuel pressure in the high-pressure fuel pipe 37 to the fuel injection controller 50.

The fuel injection controller 50 controls fuel injection of the direct injector 40. The fuel injection controller 50 includes a calculation section 51, which executes various programs, a ROM 52, which stores data such as various programs and values and arithmetic expressions used to execute programs, and a RAM 53, which temporarily stores data during execution of various programs. In the present embodiment, the fuel injection controller 50 is configured as an electronic control unit of a vehicle.

The fuel injection controller 50 is not limited to a system that performs software processing for all processes performed by the fuel injection controller 50. For example, the fuel injection controller 50 may include a dedicated hardware circuit, such as an application-specific integrated circuit (ASIC), that performs hardware processing for at least some of the processes performed by the fuel injection controller 50. That is, the fuel injection controller 50 may be configured as circuitry that includes: 1) at least one processor that operates according to a computer program (software); 2) at least one dedicated hardware circuit that performs at least some of the various processes; or 3) a combination of 1) and 2). The processor includes a CPU and memory, such as RAM and ROM, which stores program codes or instructions that enable the CPU to perform processes. The memory, or the computer-readable medium, may be any available medium that can be accessed by a general-purpose or dedicated computer.

As described above, the flow rate of the intake air detected by the air flow meter 13 and the fuel pressure in the high-pressure fuel pipe 37 detected by the fuel pressure sensor 38 are input to the fuel injection controller 50. A crank angle sensor 61 detects the rotation speed of the crack shaft rotated by the reciprocal movement of the piston 17, and the detected crank angle is input to the fuel injection controller 50. An accelerator operation amount sensor 62 detects the depression amount (operation amount) of the accelerator pedal, and the detected depression amount is input to the fuel injection controller 50. An outside air temperature sensor 63 detects the temperature of air outside the vehicle, and the detected temperature is input to the fuel injection controller 50. Further, a coolant temperature sensor 64 detects the temperature of the coolant of the internal combustion engine 10, and the detected temperature is input to the fuel injection controller 50. In the present embodiment, the fuel injection controller 50 uses the coolant temperature fed from the coolant temperature sensor 64 as the temperature of the internal combustion engine. That is, the temperature of the coolant of the internal combustion engine 10 reflects the temperature of the internal combustion engine 10.

The calculation section 51 of the fuel injection controller 50 functions as a number-of-injections determination section, which is configured to select, as the injection mode, either single injection, in which the amount of fuel required for each combustion is injected in one fuel injection, or split injection, in which the amount of fuel required for each combustion is divided and injected in multiple fuel injections, based on the operation state of the internal combustion engine.

The calculation section 51 determines the amount of fuel required for each combustion and the timing of fuel injection based on various parameters fed into the fuel injection controller 50, such as the flow rate of intake air, the fuel pressure, the detected crank angle, the depression amount of accelerator pedal, the outside air temperature, and the coolant temperature. In the present embodiment, the maximum value of the number of injections in the split injection is three. When the calculation section 51 selects the number of injections, the fuel injection controller 50 outputs pulses as drive pulses IJT for opening the direct injector 40. The number of pulses corresponds to the selected number of injections.

The calculation section 51 performs catalyst rapid warm-up control (catalyst warm-up control) when the exhaust purification catalyst 20 is inactive and fails to sufficiently function as an exhaust purification catalyst. Specifically, the calculation section 51 performs the catalyst rapid warm-up control when conditions are satisfied, such as a condition that the first predetermined time has elapsed since initiating startup of the internal combustion engine 10 and that the engine has started, a condition that the temperature of the internal combustion engine 10 is lower than the predetermined temperature, and a condition that the internal combustion engine 10 is idling. The first predetermined time is the time needed for the internal combustion engine 10 to obtain a stable engine speed after starting operation, and may be three seconds, for example. The predetermined temperature is the temperature at which the exhaust purification catalyst 20 fully functions to purify exhaust, and may be 50° C., for example. The first predetermined time and the predetermined temperature are stored in the ROM 52 of the fuel injection controller 50.

While the catalyst rapid warm-up control is performed, the calculation section 51 increases the amount of fuel required for each combustion, retards the fuel injection timing and the ignition timing of the spark plug 21, and makes other modification to the settings used while the catalyst rapid warm-up control is not performed.

During the catalyst rapid warm-up control, the calculation section 51 (the number-of-injections determination section) selects the split injection as the injection mode, in which the amount of fuel required for each combustion in the normal operation is divided and injected in multiple injections performed during the intake stroke and the compression stroke. The calculation section 51 selects the largest number possible as the number of injections in the split injection. This avoids excessive richness around the spark plug 21 and resulting deterioration of the combustion state.

On the other hand, during the catalyst rapid warm-up control, the calculation section 51 selects the single injection as the injection mode when the combustion state of the internal combustion engine 10 deteriorates, such as when the engine speed decreases excessively. The calculation section 51 advances the injection timing of the single injection from the timing in the normal catalyst rapid warm-up control. For example, the single injection mode in which the amount of fuel required for each combustion is injected in one injection during the intake stroke is selected as the injection mode. Injecting fuel during intake strokes promotes atomization of fuel in the cylinder 16, maintaining a good combustion state in the cylinder 16.

When inferior fuel is supplied to the internal combustion engine 10, the difference in characteristics between the inferior fuel and the expected fuel may deteriorate the combustion state of the internal combustion engine 10. The direct injector 40 has a minimum fuel injection amount, which is determined by factors such as the operational response of the direct injector 40 and the pressure of fuel supplied to the direct injector 40 (the performance of the high-pressure fuel pump 35). If the amount of fuel required for each combustion is divided into multiple injections and the amount per injection is less than the minimum fuel injection amount of the direct injector 40, the split injection cannot be performed. Thus, the calculation section 51 reduces the number of injections in the split injection or selects the single injection. This may cause excessive richness around the spark plug 21 and deteriorate the combustion state of the internal combustion engine 10. Further, the fuel injection amount of the direct injector 40 varies to some degree. In particular, the variations increase as the fuel injection amount of the direct injector 40 decreases, and the variations in the total amount of fuel injected in one combustion cycle increase as the number of injections in the split injection increases. Excessive variations in such fuel injection amounts may spoil the optimum air-fuel ratio around the spark plug 21 and deteriorate the combustion state of the internal combustion engine 10. During the catalyst rapid warm-up control, the combustion state of the internal combustion engine 10 may deteriorate due to various factors.

Drive pulses IJT sent from the fuel injection controller 50 are input to a drive current generation section 55, which is electrically connected to the fuel injection controller 50. The drive current generation section 55 feeds the direct injector 40 of the internal combustion engine 10 a drive current Id in accordance with the length and the number of the input drive pulses IJT. In this embodiment, the drive pulse IJT is in the ON state when the level is High, and the drive current Id increases accordingly. The direct injector 40 opens and closes according to the input drive current Id to inject fuel.

The drive current Id sent from the drive current generation section 55 is also fed to a current detection section 56, which is electrically connected to the drive current generation section 55. The current detection section 56 outputs, as a drive current detection signal IJM, a pulse signal based on the drive current Id and a predetermined current value Ix, which is a predetermined constant current. Specifically, as shown in FIGS. 4B and 4C, the current detection section 56 outputs the drive current detection signal IJM that falls to the Low level when the drive current Id exceeds the predetermined current value Ix, and rises to the High level when the drive current Id becomes less than the predetermined current value Ix. The current detection section 56 includes an analogue circuit in which known logic circuits are combined. The predetermined current value Ix is a value set to show that the drive current Id has sufficiently risen, and is stored in the ROM 52 of the fuel injection controller 50.

The calculation section 51 functions as a count section, which is configured to count the number of occurrences of the drive current Id in one combustion cycle as a number-of-injections count value Cinj. In this embodiment, the calculation section 51 increments the number-of-injections count value Cinj by one for each detection of generated drive current Id in the period between an ignition point in time in the cylinder 16 and the next ignition point in time in the cylinder 16. The number-of-injections count value Cinj is reset and returned to zero at each ignition point in time. Since the maximum number of injections in the split injection is three as described above, the number-of-injections count value Cinj is less than or equal to three.

The calculation section 51 functions as a determination section that is configured to determine based on the number-of-injections count value Cinj whether the combustion state in the cylinder 16 is satisfactory or unsatisfactory. The calculation section 51 determines that the combustion state in the cylinder 16 is unsatisfactory when the number-of-injections count value Cinj is less than three at an ignition of the cylinder 16 during the catalyst rapid warm-up control.

The calculation section 51 also functions as a determination section that is configured to determine whether the warm-up of the exhaust purification catalyst 20 is accelerated, based on the determination whether the combustion state in the cylinder 16 is satisfactory or unsatisfactory. The calculation section 51 sets the period between when the catalyst rapid warm-up control starts and when the second predetermined time Tx2 has elapsed since the start as the detection period for determining whether the warm-up of the exhaust purification catalyst 20 is accelerated. The calculation section 51 counts the total number of combustion cycles in the detection period of the cylinder 16 under evaluation as the total number of combustion cycles Ct. Further, the calculation section 51 counts, as the error detection count value Cer, the number of times at which the combustion state is determined to be unsatisfactory in the cylinder under evaluation during the detection period. The calculation section 51 determines that warm-up of the exhaust purification catalyst 20 is not accelerated when the ratio of the error detection count value Cer to the total number of combustion cycles Ct exceeds the predetermined ratio. The second predetermined time Tx2 is 10 seconds, for example, and stored in the ROM 52 of the fuel injection controller 50. The predetermined ratio is 80%, for example, and stored in the ROM 52 of the fuel injection controller 50 as a coefficient K (K=0.8) smaller than 1.

Figure 2:
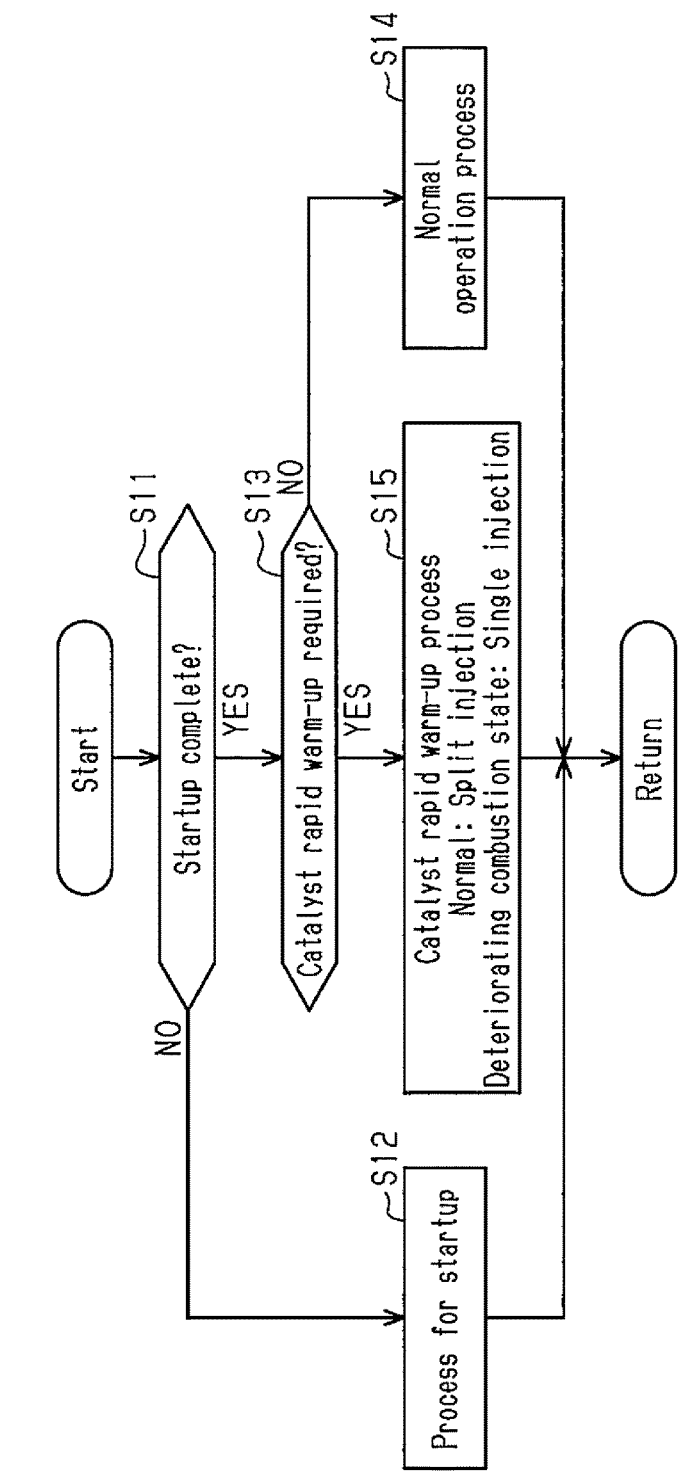
FIG. 2 is a flowchart showing catalyst rapid warm-up control.

The calculation section 51 performs the following processes. Referring to FIG. 2, the process associated with the catalyst rapid warm-up control on the exhaust purification catalyst 20 is first described. The following description uses only one cylinder 16 as an example, but the sequence of processes is performed on all cylinders 16 in parallel and in the predetermined cycle.

When startup of the internal combustion engine 10 is initiated by operation of the ignition button of the vehicle, for example, the calculation section 51 performs the process of Step S11 shown in FIG. 2.

In Step S11, the calculation section 51 determines whether the startup of the internal combustion engine 10 has completed. Specifically, the calculation section 51 determines that the startup is complete when the first predetermined time has elapsed since initiating the startup of the internal combustion engine 10. When the startup of the internal combustion engine 10 is not complete (NO in Step S11), the process of the calculation section 51 moves to Step S12. Step S12 performs the process for startup of the internal combustion engine 10. Then, the process of the calculation section 51 returns. When the startup of the internal combustion engine 10 is complete (YES in Step S11), the process of the calculation section 51 moves to Step S13.

In Step S13, the calculation section 51 determines whether the catalyst rapid warm-up control for the exhaust purification catalyst 20 is required. Specifically, the calculation section 51 determines that the catalyst rapid warm-up control is required when the current temperature of the internal combustion engine 10 is lower than the predetermined temperature (50° C.) and the internal combustion engine 10 is idling. When the catalyst rapid warm-up control is not required (NO in Step S13), the process of the calculation section 51 moves to Step S14 and the calculation section 51 performs the normal operation process that differs from the catalyst rapid warm-up control. Then, the process of the calculation section 51 returns. When the catalyst rapid warm-up control is required (YES in Step S13), the process of the calculation section 51 moves to Step S15 and the calculation section 51 performs the catalyst rapid warm-up control. When starting the catalyst rapid warm-up control, the calculation section 51 starts measuring the elapsed time Tp since the start.

During the catalyst rapid warm-up control, the calculation section 51 (the number-of-injections determination section) normally performs the split injection as described above, but performs the single injection if the combustion state of the internal combustion engine 10 becomes deteriorated. Then, the process of the calculation section 51 returns.

Figure 3:
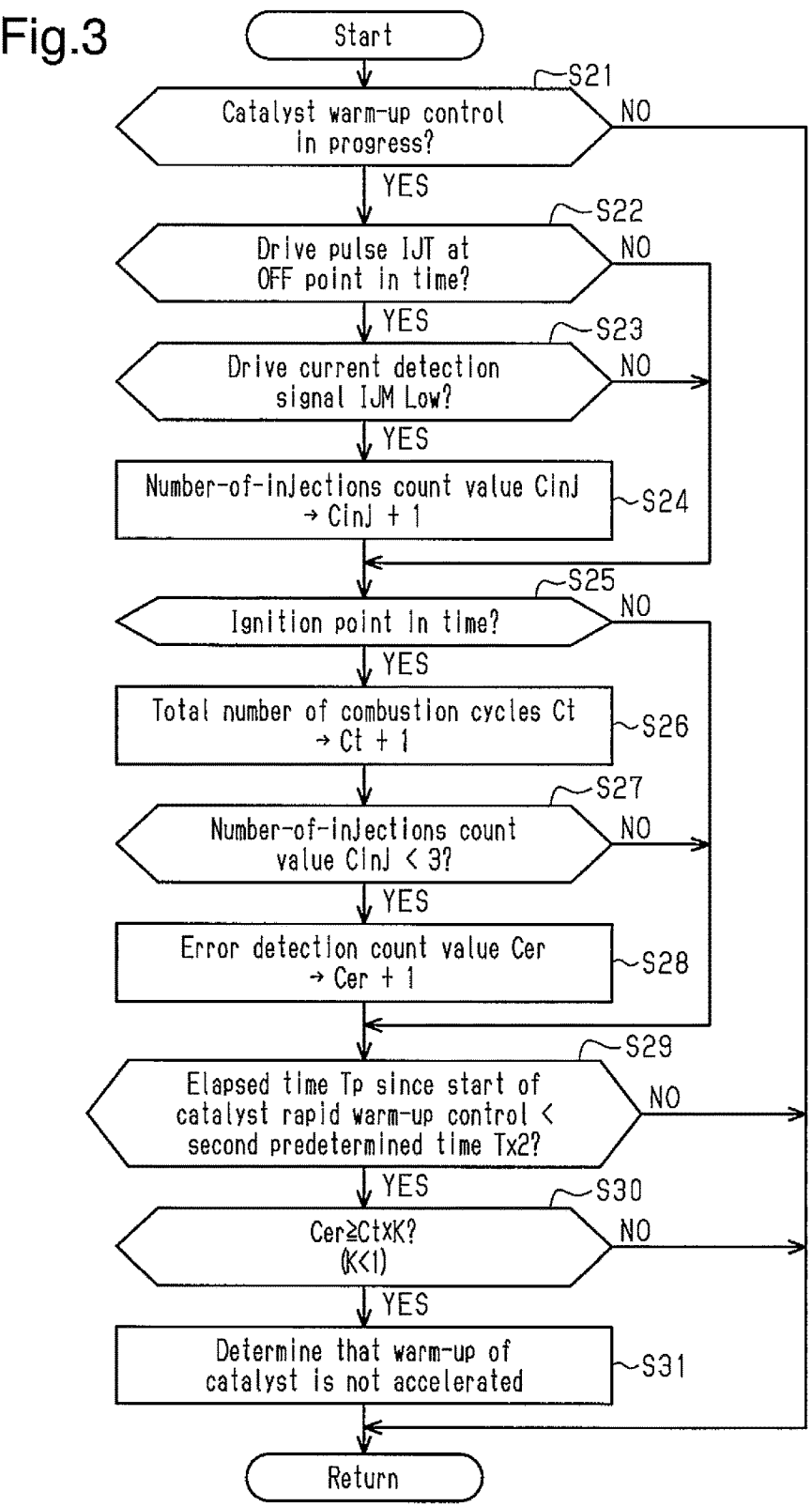
FIG. 3 is a flowchart showing the determination process relating to the acceleration of warm-up of an exhaust purification catalyst.

Referring to FIG. 3, the processes are described associated with the determination whether the combustion state in the cylinder 16 is satisfactory and the determination whether the warm-up of the exhaust purification catalyst 20 is accelerated. The following description uses only one cylinder 16 as an example, but the sequence of processes is performed on all cylinders 16 in parallel and in the predetermined cycle.

When the internal combustion engine 10 is started by operation of the ignition button of the vehicle, for example, the process of the calculation section 51 moves to Step S21.

In Step S21, the calculation section 51 determines whether the catalyst rapid warm-up control is in progress. When the catalyst rapid warm-up control is not in progress (NO in Step S21), the process of the calculation section 51 returns. When the catalyst rapid warm-up control is in progress (YES in Step S21), the process of the calculation section 51 moves to Step S22.

In Step S22, the calculation section 51 determines whether the drive pulse IJT is at a falling point, at which the drive pulse IJT falls from ON to OFF. Specifically, the calculation section 51 determines that the drive pulse IJT is at a falling point when the drive pulse IJT was ON in the previous control cycle and becomes OFF in the current control cycle. When the drive pulse IJT is not at a falling point (NO in Step S22), the process of the calculation section 51 moves to Step S25. When the drive pulse IJT is at a falling point (YES in Step S22), the process of the calculation section 51 moves to Step S23.

In Step S23, the calculation section 51 determines whether the drive current detection signal IJM at the falling point of the drive pulse IJT is Low. When the drive current detection signal IJM at the falling point of drive pulse IJT is not at the Low level (NO in Step S23), the process of the calculation section 51 moves to Step S25. When the drive current detection signal IJM at the falling point of drive pulse IJT is at the Low level (YES in Step S23), the process of the calculation section 51 moves to Step S24.

In Step S24, the calculation section 51 (the count section) adds one to the number-of-injections count value Cinj. Then, the process of the calculation section 51 moves to Step S25.

In Step S25, the calculation section 51 determines whether the cylinder 16 is at an ignition point in time. When the cylinder 16 is not at an ignition point in time (NO in Step S25), the process of the calculation section 51 moves to Step S29. When the cylinder 16 is at an ignition point in time (YES in Step S25), the process of the calculation section 51 moves to Step S26.

In Step S26, the calculation section 51 adds on to the total number of combustion cycles Ct. Then, the process of the calculation section 51 moves to Step S27.

In Step S27, the calculation section 51 (the determination section) determines whether the current number-of-injections count value Cinj is less than 3. When the number-of-injections count value Cinj is three (NO in Step S27), the process of the calculation section 51 moves to Step S29 after clearing the number-of-injections count value Cinj back to zero. When the number-of-injections count value Cinj is less than three (YES in Step S27), the process of the calculation section 51 moves to Step S28 after clearing the number-of-injections count value Cinj back to zero.

In Step S28, the calculation section 51 (the determination section) determines that the combustion state in the cylinder 16 under evaluation is unsatisfactory and add one to the error detection count value Cer. Then, the process of the calculation section 51 moves to Step S29.

Step S29 determines whether the elapsed time Tp since the start of catalyst rapid warm-up control is less than the second predetermined time Tx2. When the elapsed time Tp is greater than or equal to the second predetermined time Tx2 (NO in Step S29), the process of the calculation section 51 returns. When the elapsed time TP is less than the second predetermined time Tx2 (YES in Step S29), the process of the calculation section 51 moves to Step S30.

In Step S30, the calculation section 51 determines whether the ratio of the error detection count value Cer to the total number of combustion cycles Ct exceeds the predetermined ratio. Specifically, the calculation section 51 determines whether the error detection count value Cer is greater than or equal to the value obtained by multiplying the total number of combustion cycles Ct by the coefficient K (K<1). When the ratio of the error detection count value Cer does not exceed the predetermined ratio (NO in Step S30), the error detection count value Cer and the total number of combustion cycles Ct are cleared to zero and the process of the calculation section 51 returns. When the ratio of the error detection count value Cer exceeds the predetermined ratio (YES in Step S30), the error detection count value Cer and the total number of combustion cycles Ct are cleared to zero and the process of the calculation section 51 moves to Step S31.

In Step S31, the calculation section 51 (the determination section) determines that the warm-up of the exhaust purification catalyst 20 is not accelerated. The calculation section 51 performs a warning process, which may be illumination of a warning lamp or issuance of a warning sound. The present embodiment determines that the warm-up of the exhaust purification catalyst 20 is not accelerated when any one of the cylinders 16 has a ratio of error detection count value Cer that exceeds the predetermined ratio. Then, the process of the calculation section 51 moves to Step S21.

The operation of the fuel injection controller 50 configured as described above, in particular, the operation in the process of determining whether the combustion state in the cylinder 16 is satisfactory or unsatisfactory, is described below for each of the case where the combustion state is satisfactory and the case where the combustion state is unsatisfactory.

During the catalyst rapid warm-up control, the calculation section 51 (the number-of-injections determination section) normally selects the split injection as the injection mode in which the number of injections is three. Thus, as shown in FIG. 4A, in one combustion cycle between an ignition point in time t10 of a particular cylinder 16 and the next ignition point in time t20 of the cylinder 16, three pulse signals are output successively as drive pulses IJT.

As shown in FIG. 4B, as the three pulse signals are output successively as drive pulses IJT, the drive current Id rises after the ignition point in time t10 substantially at the same time as the point in time t11, at which the first drive pulse IJT rises to the ON state. The drive current Id reaches the predetermined current value Ix at the point in time t12, which is slightly after the point in time t11. As shown in FIG. 4C, the drive current detection signal IJM falls to the Low level at the point in time t12. The drive current Id becomes less than the predetermined current value Ix substantially at the same time as the point in time t13, at which the first drive pulse IJT falls to the OFF state. The drive current detection signal IJM rises to the High level slightly after the point in time t13 due to the predetermined delay time of the current detection section 56. FIGS. 4A to 4D and 5A to 5D do not show this delay of the current detection section 56.

As described above, the drive current detection signal IJM rises to the High level slightly after the point in time t13. Thus, the drive current detection signal IJM is still at the Low level at the point in time t13, at which the drive pulse IJT falls to OFF, indicating that the drive current Id is generated. Accordingly, one is added to the number-of-injections count value Cinj at the point in time t13, so that the number-of-injections count value Cinj becomes 1. At this time, since the next ignition point in time t20 in this cylinder 16 has not arrived, the same process as described above is repeated again.

Accordingly, as shown in FIG. 4D, the number-of-injections count value Cinj is incremented by one in response to each of three occurrences of the drive current Id, and the number-of-injections count value Cinj eventually becomes three. Then, the ignition point in time t20 arrives with the number-of-injections count value Cinj being three. The calculation section 51 (the determination section) therefore determines at the ignition point in time t20 that the combustion state in the cylinder 16 is satisfactory.

When the combustion state of the internal combustion engine 10 is deteriorated, such as when inferior fuel is supplied to the internal combustion engine 10, the engine speed may become less than the level required for a stable driving state during the catalyst rapid warm-up control. When the combustion state of the internal combustion engine 10 deteriorates, the calculation section 51 (the number-of-injections determination section) of the fuel injection controller 50 may perform the single injection, with the timing of fuel injection advanced, even during the catalyst rapid warm-up control.

In this case, as shown in FIG. 5A, only one pulse signal is output as a drive pulse IJT in the period between an ignition point in time t10 of a particular cylinder 16 and the next ignition point in time t20 of the cylinder 16.

As shown in FIG. 5B, when only one pulse signal is output as a drive pulse IJT, the drive current Id rises after the ignition point in time t10 substantially at the same time as the point in time t11, at which the first drive pulse IJT rises to the ON state. The drive current Id reaches the predetermined current value Ix at the point in time t12, which is slightly after the point in time tn. As shown in FIG. 5C, the drive current detection signal IJM falls to the Low level at the point in time t12. The drive current Id becomes less than the predetermined current value Ix substantially at the same time as the point in time t13, at which the first drive pulse IJT falls to the OFF state. The drive current detection signal IJM rises to the High level slightly after the point in time t13 due to the predetermined delay time of the current detection section 56.

As described above, the drive current detection signal IJM rises to the High level slightly after the point in time t13. Thus, the drive current detection signal IJM is still at the Low level at the point in time t13, at which the drive pulse IJT falls to OFF, indicating that the drive current Id is generated. Accordingly, one is added to the number-of-injections count value Cinj at the point in time t13, so that the number-of-injections count value Cinj becomes one.

In this example, only one drive pulse IJT is output in the period between the ignition point in time t10 of the particular cylinder 16 and the next ignition point in time t20 of the cylinder 16. As such, in the period between the point in time t13 and the ignition point in time t20, the drive pulse IJT does not become ON, and the drive current detection signal IJM does not become the Low level. Thus, as shown in FIG. 5D, the ignition point in time t20 arrives with the number-of-injections count value Cinj remaining one from the ignition point in time t13. The calculation section 51 (the determination section) therefore determines at the ignition point in time t20 that the combustion state in the cylinder 16 is unsatisfactory.

The example described above selects the single injection. When the split injection is selected and the number of injections in the split injection is two, the ignition point in time t20 arrives with the number-of-injections count value Cinj remaining two. Accordingly, the calculation section 51 (the determination section) determines that the combustion state in the cylinder 16 is unsatisfactory.

The above embodiment achieves the following advantages.

(1) In the above embodiment, during the catalyst rapid warm-up control for the exhaust purification catalyst 20, when the number of occurrences of the drive current Id for the direct injector 40, that is, the number-of-injections count value Cinj, is one, the calculation section 51 determines that the single injection is in progress and that the combustion state in the cylinder 16 under evaluation is unsatisfactory. The determination that the combustion state in the cylinder 16 is unsatisfactory is achieved by determining whether the combustion state is satisfactory or unsatisfactory based on the number of occurrences of the drive current Id, which actually drives the direct injector 40.

(2) In addition, the calculation section 51 (the determination section) of the above embodiment determines that the combustion state in the cylinder 16 is unsatisfactory not only when the number of occurrences of the drive current is one but also when the number is less than three, which is the maximum number of injections in the split injection. The calculation section 51 thus determines that the combustion state is unsatisfactory when the number of injections is not ideal although the split injection is performed.

(3) The above embodiment determines that warm-up of the exhaust purification catalyst 20 is not accelerated when the combustion state in the cylinder 16 under evaluation is frequently determined to be unsatisfactory (80% or more) during the detection period between the start of catalyst rapid warm-up control and when the second predetermined time Tx2 has elapsed. Thus, when the combustion state remains deteriorated for some time, such as when inferior fuel is supplied to the internal combustion engine 10, the calculation section 51 determines that the warm-up of the exhaust purification catalyst 20 is not accelerated. On the other hand, when the single injection is briefly performed for any reason, the calculation section 51 is unlikely to determine that the warm-up of the exhaust purification catalyst 20 is not accelerated. This prevents unnecessary identification of absence of warm-up acceleration, which would otherwise confuse the driver of the vehicle.

(4) The above embodiment performs processes such as the counting of the number-of-injections count value Cinj based on the drive current detection signal IJM only after determining that the catalyst rapid warm-up control is in progress. Thus, when the catalyst rapid warm-up control is not in progress, unnecessary processes such as the counting of the number-of-injections count value Cinj are not performed. Further, when the catalyst rapid warm-up control is not in progress, the determination whether the combustion state in the cylinder 16 is satisfactory and the determination whether the warm-up of the exhaust purification catalyst 20 is accelerated are not performed, eliminating the possibility that such determination processes unintentionally affect other control when the catalyst rapid warm-up control is not performed.

The above embodiment may be modified as follows.

As long as the internal combustion engine 10 includes direct injectors 40 that directly inject fuel into cylinders 16 and are capable of the split injection, the structures of the internal combustion engine 10, such as the number of cylinders 16, may be modified as appropriate.

The above embodiment uses the temperature of the coolant of the internal combustion engine 10 detected by the coolant temperature sensor 64 as the temperature of the internal combustion engine 10, but the temperature of the internal combustion engine 10 may be obtained by other detection methods. Any temperature can be used that has a correlation with the temperature of the internal combustion engine 10 and from which the temperature of the internal combustion engine 10 is assumable.

The conditions for performing the catalyst rapid warm-up control may be changed as long as the conditions include the condition that the temperature of the exhaust purification catalyst 20 is moderately low and requires warm-up. For example, the catalyst rapid warm-up control may be performed even when the internal combustion engine 10 is not idling if the engine speed of the internal combustion engine 10 is stable. If performing the catalyst rapid warm-up control immediately after initiating startup of the internal combustion engine 10 does not hinder stable startup of the internal combustion engine 10, the catalyst rapid warm-up control may be performed without waiting for the first predetermined time from the initiation of startup of the internal combustion engine 10.

It may be configured that the catalyst rapid warm-up control is not performed, although the temperature of the internal combustion engine 10 is lower than the predetermined temperature, if the temperature is extremely low (e.g., lower than $-10°$ C.). Such extreme coldness hinders startup of the internal combustion engine 10, and other controls for extreme coldness should be performed before the catalyst rapid warm-up control.

In the embodiment described above, the maximum value of the number of injections in the split injection is set to three, but the number of injections may be 2 or more than three. The number of injections may be modified according to factors such as the structure of the direct injector 40 and the pressure of fuel supplied to the direct injector 40 (the performance of the high-pressure fuel pump 35).

Depending on the structure of the direct injector 40 and the pressure of fuel supplied to the direct injector 40, the number of injections in the split injection may be three or more. A greater number of injections in the split injection during the catalyst rapid warm-up control (catalyst warm-up control) improves the combustion of fuel even if the amount of fuel used for each combustion is increased, facilitating the warm-up of the exhaust purification catalyst 20. Therefore, during the catalyst warm-up control, a greater number is preferably used as the number of split injections.

In the above embodiment, the single calculation section 51 has the functions of the number-of-injections determination section, the count section, and the determination section, but these functions may be performed by separate calculation sections. In this case, the fuel injection controller 50 is configured by a plurality of control chips.

In the above embodiment, the drive current generation section 55 and the current detection section 56 are separate from the fuel injection controller 50. However, the drive current generation section 55 and the current detection section 56 may be implemented in the fuel injection controller 50. That is, the fuel injection controller 50, the current detection section 56, and the drive current generation section 55 may be configured as one control chip.

In the above embodiment, the determination whether the catalyst rapid warm-up control is in progress may be performed at a different point in time, for example at a point in time between Step S30 and Step S31 shown in FIG. 3. In this case, when the catalyst rapid warm-up control is in progress, the process of Step S31 is performed. When the catalyst rapid warm-up control is not in progress, the process may return.

The monitoring of the number of occurrences of the drive current Id based on the drive current detection signals IJM does not have to be performed over the entire duration of one combustion cycle. For example, if there is a period in one combustion cycle during which fuel injection of the direct injector 40 is impossible, the sequence of processes shown in FIG. 3 may be suspended during that period and performed during other periods.

The characteristics of the drive current detection signal IJM are not limited to those in the embodiment described above. For example, the drive current detection signal IJM may rise to the High level when the drive current Id exceeds the predetermined current value Ix and may fall to the Low level when the drive current Id becomes less than the predetermined current value Ix. Further, if necessary, the drive current detection signal IJM may be output through a delay circuit, for example.

In the embodiment described above, the combustion state in the cylinder 16 under evaluation may be determined to be satisfactory not only when the number-of-injections count value Cinj is three, which is the maximum value of injections in the split injection, but also when the value is two. That is, the combustion state may be determined to be unsatisfactory when the single injection is selected to be performed (when the number-of-injections count value Cinj is one), and the combustion state may be determined to be satisfactory when the split injection is selected to be performed (when the number-of-injections count value Cinj is two or more). If at least the split injection is performed during the catalyst rapid warm-up control, the warm-up of the exhaust purification catalyst 20 is accelerated to some extent, allowing the combustion state to be determined to be satisfactory.

The point in time of the determination whether the number-of-injections count value Cinj is less than three does not have to be an ignition point in time of the spark plug 21. The determination whether the number-of-injections count value Cinj is less than three may be performed at an end point in time of a compression stroke or an end point in time of an exhaust stroke of the cylinder 16. That is, the determination whether the number-of-injections count value Cinj is less than three may be performed at any point in time that allows counting of the number of occurrences of the drive current Id in one combustion cycle.

It may be determined that the warm-up of the exhaust purification catalyst 20 is not accelerated when the ratio of the error detection count value Cer to the total number of combustion cycles Ct exceeds the predetermined ratio in any or all of the cylinders 16.

The determination whether the warm-up of the exhaust purification catalyst 20 is accelerated does not have to depend on the ratio of the error detection count value Cer to the total number of combustion cycles Ct. For example, it may be determined that the internal combustion engine 10 is operating under abnormal conditions when the combustion state in a particular cylinder 16 is successively determined to be unsatisfactory a predetermined number of times.

Abnormal fuel injection may be detected based on the point in time t12, at which the drive current detection signal IJM rises to the High level, or the point in time t13, at which the drive current detection signal IJM falls to the Low level. For example, the fuel injection may be determined to be abnormal when the point in time t12, at which the drive current detection signal IJM rises to the High level, does not coincide with the expected valve opening point in time of the direct injector 40. Similarly, the fuel injection may be determined to be abnormal when the point in time t13, at which the drive current detection signal IJM falls to the Low level, does not coincide with the expected valve closing point in time of the direct injector 40. Further, the fuel injection may be determined to be abnormal when the period between the point in time t12, at which the drive current detection signal IJM rises to the High level, and the point in time t13, at which the drive current detection signal IJM falls to the Low level, does not coincide with the expected valve opening period of the direct injector 40.

The invention claimed is:

1. A fuel injection controller for an internal combustion engine, wherein the internal combustion engine includes an electromagnetic direct injector, which is configured to inject fuel into a cylinder, and an exhaust purification catalyst, which is located in an exhaust passage to purify exhaust, the fuel injection controller comprising circuitry that is configured to
    select, as an injection mode, either single injection, in which an amount of fuel required for each combustion is injected in one injection, or split injection, in which the amount of fuel required for each combustion is divided and injected in a plurality of fuel injections, in accordance with an operation state of the internal combustion engine,
    count, based on a drive current detection signal, which indicates that a drive current is generated to be fed to the direct injector, a number of occurrences of the drive current in one combustion cycle as a number-of-injections count value, and
    determine, based on the number-of-injections count value, whether a combustion state in the cylinder is satisfactory,
    wherein the circuitry is configured to determine that the combustion state in the cylinder is unsatisfactory if the number-of-injections count value in one combustion cycle is one when catalyst warm-up control is being performed on the exhaust purification catalyst with a temperature of the internal combustion engine being lower than or equal to a predetermined temperature.

2. The fuel injection controller according to claim 1, wherein the circuitry is further configured to
    set, when the split injection is selected as the injection mode, the number of times of injection while setting a maximum number of times of injection to N (N being a natural number greater than or equal to three), and
    determine that the combustion state in the cylinder is unsatisfactory if the number-of-injections count value in one combustion cycle is less than N when the catalyst warm-up control is being performed with the temperature of the internal combustion engine being lower than or equal to the predetermined temperature.

3. The fuel injection controller according to claim 1, wherein
    the cylinder is one of a plurality of cylinders, and
    the circuitry is further configured to
        determine whether a combustion state of a particular one of the cylinders is satisfactory in each combustion cycle of the particular cylinder during a predetermined detection period, and
        determine that warm-up of the exhaust purification catalyst is not accelerated when a ratio of a number of combustion cycles in which the combustion state is determined to be unsatisfactory to a total number of combustion cycles of the particular cylinder in the detection period exceeds a predetermined ratio.

4. A method for controlling fuel injection of an internal combustion engine, wherein the internal combustion engine includes an electromagnetic direct injector, which is configured to inject fuel into a cylinder, and an exhaust purification catalyst, which is located in an exhaust passage to purify exhaust, the method comprising:
    selecting, as an injection mode, either single injection, in which an amount of fuel required for each combustion is injected in one injection, or split injection, in which the amount of fuel required for each combustion is divided and injected in a plurality of fuel injections, in accordance with an operation state of the internal combustion engine;

counting, based on a drive current detection signal, which indicates that a drive current is generated to be fed to the direct injector, a number of occurrences of the drive current in one combustion cycle as a number-of-injections count value; and determining, based on the number-of-injections count value, whether a combustion state in the cylinder is satisfactory, wherein the determining whether the combustion state in the cylinder is satisfactory includes determining that the combustion state in the cylinder is unsatisfactory if the number-of-injections count value in one combustion cycle is one when catalyst warm-up control is being performed on the exhaust purification catalyst with a temperature of the internal combustion engine being lower than or equal to a predetermined temperature.

5. The method according to claim 4, further comprising:

setting, when the split injection is selected as the injection mode, the number of times of injection while setting a maximum number of times of injection to N (N being a natural number greater than or equal to three), and determining that the combustion state in the cylinder is unsatisfactory if the number-of-injections count value in one combustion cycle is less than N when the catalyst warm-up control is being performed with the temperature of the internal combustion engine being lower than or equal to the predetermined temperature.

6. The method according to claim 4, wherein the cylinder is one of a plurality of cylinders, the method further comprising:

determining whether a combustion state of a particular one of the cylinders is satisfactory in each combustion cycle of the particular cylinder during a predetermined detection period, and determining that warm-up of the exhaust purification catalyst is not accelerated when a ratio of a number of combustion cycles in which the combustion state is determined to be unsatisfactory to a total number of combustion cycles of the particular cylinder in the detection period exceeds a predetermined ratio.

* * * * *